US009548167B2

(12) United States Patent
Amin-Sanayei et al.

(10) Patent No.: US 9,548,167 B2
(45) Date of Patent: Jan. 17, 2017

(54) AQUEOUS POLYVINYLIDENE FLUORIDE COMPOSITION

(71) Applicant: Arkema Inc., King of Prussia, PA (US)

(72) Inventors: Ramin Amin-Sanayei, Malvern, PA (US); Ravi R. Gupta, Pottstown, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 14/953,757

(22) Filed: Nov. 30, 2015

(65) Prior Publication Data

US 2016/0086742 A1 Mar. 24, 2016

Related U.S. Application Data

(63) Continuation of application No. 12/788,427, filed on May 27, 2010, now Pat. No. 9,202,638.

(60) Provisional application No. 61/182,364, filed on May 29, 2009.

(51) Int. Cl.

| | |
|---|---|
| ***H01G 11/48*** | (2013.01) |
| ***H01G 11/52*** | (2013.01) |
| ***H01M 10/052*** | (2010.01) |
| ***H01M 2/16*** | (2006.01) |
| ***H01M 4/131*** | (2010.01) |
| ***H01M 4/136*** | (2010.01) |
| ***H01M 4/62*** | (2006.01) |
| ***H01M 4/86*** | (2006.01) |
| ***H01M 8/10*** | (2016.01) |
| ***H01M 4/04*** | (2006.01) |
| ***H01M 4/139*** | (2010.01) |
| *H01M 4/1391* | (2010.01) |
| *H01M 4/1393* | (2010.01) |
| *H01M 4/1397* | (2010.01) |
| *H01M 10/0525* | (2010.01) |

(52) U.S. Cl.

CPC .............. *H01G 11/48* (2013.01); *H01G 11/52* (2013.01); *H01M 2/1673* (2013.01); *H01M 4/0404* (2013.01); *H01M 4/131* (2013.01); *H01M 4/136* (2013.01); *H01M 4/139* (2013.01); *H01M 4/623* (2013.01); *H01M 4/8668* (2013.01); *H01M 8/1004* (2013.01); *H01M 10/052* (2013.01); *H01M 4/1391* (2013.01); *H01M 4/1393* (2013.01); *H01M 4/1397* (2013.01); *H01M 4/621* (2013.01); *H01M 10/0525* (2013.01); *H01M 2008/1095* (2013.01); *Y02E 60/122* (2013.01); *Y02E 60/13* (2013.01); *Y02P 70/54* (2015.11)

(58) Field of Classification Search

None

See application file for complete search history.

(56) References Cited

U.S. PATENT DOCUMENTS

| | | | |
|---|---|---|---|
| 4,039,497 | A | 8/1977 | Troussier et al. |
| 5,776,637 | A | 7/1998 | Kashio et al. |
| 6,096,101 | A | 8/2000 | Liu et al. |
| 6,156,453 | A | 12/2000 | Shimizu et al. |
| 6,200,703 | B1 | 3/2001 | Kashio et al. |
| 6,498,207 | B1 | 12/2002 | Hoshikawa et al. |
| 6,692,873 | B1 | 2/2004 | Park et al. |
| 7,220,483 | B2 | 5/2007 | Coates et al. |
| 7,282,528 | B2 | 10/2007 | Asano et al. |
| 7,659,335 | B2 | 2/2010 | Konabe |
| 8,466,231 | B2 | 6/2013 | Dadalas et al. |
| 2002/0168569 | A1 | 11/2002 | Barriere et al. |
| 2005/0129838 | A1 | 6/2005 | Naarmann et al. |
| 2005/0221186 | A1 | 10/2005 | Shimizu et al. |
| 2006/0078800 | A1 | 4/2006 | Konabe |
| 2006/0234128 | A1 | 10/2006 | Tu |
| 2007/0135546 | A1 | 6/2007 | Amin-Sanayei et al. |
| 2008/0038447 | A1 | 2/2008 | Tu |
| 2008/0078718 | A1 | 4/2008 | Tada et al. |
| 2008/0187838 | A1 | 8/2008 | Le |
| 2008/0264864 | A1 | 10/2008 | Dadalas et al. |
| 2010/0304270 | A1 | 12/2010 | Amin-Sanayei et al. |

FOREIGN PATENT DOCUMENTS

| | | |
|---|---|---|
| EP | 0483887 | 5/1992 |
| JP | 6280079 | 10/1994 |
| JP | 11003709 | 1/1999 |
| JP | 11250937 | 9/1999 |
| JP | 11273726 | 10/1999 |
| JP | 2000323363 | 11/2000 |
| JP | 2000357505 | 12/2000 |
| JP | 2004235068 | 8/2004 |
| JP | 2007122907 | 5/2007 |
| JP | 2009158335 | 7/2009 |
| WO | WO2010/106292 | 9/2010 |

OTHER PUBLICATIONS

Poulsen et al., "More environmentally friendly alternatives to PFOS-compounds and PFOA," 2005, Danish Ministry of the Environment.

*Primary Examiner* — Ula C Ruddock
*Assistant Examiner* — Matthew Van Oudenaren
(74) *Attorney, Agent, or Firm* — Thomas F. Roland

(57) ABSTRACT

The invention relates to an aqueous fluoropolymer, and preferably polyvinylidene fluoride (PVDF), composition for manufacturing electrodes for use in non-aqueous-type electrochemical devices, such as batteries and electric double layer capacitors. The composition contains aqueous PVDF binder, and one or more powdery electrode-forming materials. In one embodiment, the composition is free of fluorinated surfactant In another embodiment, one or more fugitive adhesion promoters are added. The electrode formed from the composition of the invention exhibits interconnectivity and irreversibility that is achieved from the use of aqueous PVDF binder.

9 Claims, No Drawings

AQUEOUS POLYVINYLIDENE FLUORIDE COMPOSITION

This application is a continuation application of copending U.S. application Ser. No. 12/788,427, filed May 27, 2010. This application also claims benefit, under U.S.C. §119(e) of U.S. Provisional Application No. 61/182,364, filed May 29, 2009. The cited references are incorporated herein by reference.

FIELD OF THE INVENTION

The invention relates to an aqueous fluoropolymer, and preferably polyvinylidene fluoride (PVDF), composition for manufacturing electrodes for use in non-aqueous-type electrochemical devices, such as batteries and electric double layer capacitors. The composition contains aqueous PVDF binder, and one or more powdery electrode-forming materials. In one embodiment, the starting fluoropolymer dispersion, and also preferably the composition is free of fluorinated surfactant. In another embodiment, one or more fugitive adhesion promoters are added. The electrode formed from the composition of the invention exhibits interconnectivity and irreversibility that is achieved from aqueous PVDF binder.

BACKGROUND OF THE INVENTION

There is a trend in the electronics industry to produce smaller devices, powered by smaller and lighter batteries. Batteries of non-aqueous electrolytic solutions in combination with a negative electrode—such as a lithium compound or carbonaceous material with lithium ions, and a positive electrode—such as lithium metal oxides can provide higher power and lower weight.

Polyvinylidene fluoride, because of its excellent electrochemical resistance and superb adhesion among fluoropolymers, has been found to be a useful binder for forming electrodes to be used in non-aqueous electrolytic devices. U.S. Pat. Nos. 5,776,637 and 6,200,703, incorporated herein by reference, describe a PVDF binder solution in organic solvents with a powdery electrode material for use in forming an electrode to be used in a non-aqueous-type battery. JP 2000357505 describes PVDF blended with a positive active material and carbon and then dissolved in NMP as the solvent to produce a paste. The process is in line with conventional solvent casting processes for electrodes where a large amount of NMP solvent is used as a dispersion media.

The role of the organic solvent is generally to dissolve PVDF in order to provide good adhesion (non-reversible adhesion) between the powdery electrode material particles upon evaporation of the organic solvent. Currently, the organic solvent of choice is N-methyl-2-pyrrolidone (NMP). PVDF binder cast from a solvent solution provides non-reversible adhesion in electrodes and an interconnectivity of all the active ingredients in the electrode composition. The bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move across the electrode, and lithium ion mobility requires interconnectivity within the electrode between powdery particles.

Unfortunately, there are several issues with these organic-solvent based binder compositions. A large amount of solvent is required for traditional electrode casting process because the slurry exhibits an abnormally high viscosity at higher concentration levels of PVDF (above 10-20 wt %), making the preparation of the electrode-forming composition difficult and the suppression of gelation of the electrode-forming composition difficult as well.

Further, the organic-solvent-based slurry presents safety, health and environmental dangers that are not present in an aqueous system. Organic solvents are generally toxic and flammable, volatile in nature, and involve special manufacturing controls to mitigate risk and reduce environmental pollution from the organic solvent. In addition, a large carbon footprint is associated with use of organic solvents that is not environmentally desirable. Further, extra manufacturing steps, costing time, money, and energy are involved to isolate PVDF formed in an aqueous media, drying the PVDF to a powder, then dissolving the powder in a solvent.

There is an environmentally-driven, and safety-driven desire to be able to produce excellent, interconnective PVDF-based electrodes, without the massive use of organic solvents.

To effectively employ waterborne slurries in electrode-forming processes, it is important to develop binder systems that are compatible with current manufacturing practices and provide desired properties of the intermediate and final products. Some common criteria include: a) stability of the waterborne fluoropolymer dispersion, having sufficient shelf-life, b) stability of the slurry after admixing the powdery material, c) appropriate viscosity of the slurry to facilitate good aqueous casting, and d) sufficient interconnectivity within the electrode which is non-reversible after drying. Additionally, from a regulatory view, fluoropolymers made without fluorosurfactants are preferred.

U.S. Pat. No. 7,282,528 entitled "electrode additive" describes fluoropolymer dispersions for cathode electrodes, which are made by using per-fluorinated surfactants. Surfactants that do not substantially remain in the electrode after drying are post-added to the fluoropolymer dispersions during concentration of the dispersion. The patent fails to teach or suggest the use of fluoropolymer made with non-fluorinated surfactant, or the use of fugitive adhesion promoters to provide interconnectivity in the electrode that is non-reversible, and exemplifies the use of only polytetrafluoroethylene (PTFE) binders, or blends of other fluoropolymers with 50% or more PTFE. The negative electrode of the examples uses a conventional solvent-based PVDF solution.

U.S. Pat. No. 7,659,335 describes similar fluoropolymer dispersions useful as electrode binders, with a specific class of non-ionic post-polymerization stabilizer. While many fluoropolymers are listed, "PTFE is preferred since melt-processing is substantially impossible". There is no mention of fugitive adhesion promoters that could provide interconnectivity within the electrode or any other ingredients that are required. There are large differences in the properties of, processing of, and final electrodes formed from PTFE and PVDF binders. PTFE polymers have very high melting points and exhibit very strong resistance to common solvents. As a result, PTFE particles are not able to soften, flow, and adhere to powdery particles and to provide interconnectivity within an electrode. Additionally, PTFE and its blends with other fluoropolymers do not meet some of the criteria needed to form proper electrodes including stability of the waterborne fluoropolymer dispersion with sufficient shelf-life and PTFE binders do not provide sufficient interconnectivity in electrodes which is non-reversible. PVDF based binders made in accordance with this invention exhibit sufficient shelf stability, do not need concentrating steps, and as opposed to PTFE based binders, provide connectivity by adding fugitive adhesion promoters. The PVDF polymer particles are able to soften, flow and adhere to powdery materials during electrode manufacture, resulting electrodes with high connectivity that are non-reversible.

Surprisingly, a stable, aqueous electrode-forming composition has now been found for producing high quality electrodes for non-aqueous batteries and other devices having interconnectivity and irreversibility. The composition contains one or more fluoropolymers, preferably PVDF, powdery electrode material, and optionally surfactants, and fugitive adhesion promoters. Preferably the aqueous composition is free of fluorinated surfactants. The aqueous composition of the invention provides many performance, manufacturing and environmental advantages over solvent-based PVDF compositions and solvent or aqueous PTFE compositions:

a) Aqueous PVDF-based compositions are safer to use and process, less hazardous to health, and more environmentally friendly than solvent-based PVDF compositions.
b) Aqueous PVDF dispersions are advantageously synthesized using non-fluorinated surfactant.
c) Aqueous PVDF dispersions can be used as synthesized, without the need for isolating and drying to a powder, or concentration of the latex—saving time and energy.
c) Water has a lower boiling point than typically used organic solvents, so the coating can be dried at a lower temperature, or a shorter period of time, if desired.
d) Aqueous PVDF dispersions contain PVDF particles that can be softened to adhere to electrode-forming particles by using fugitive adhesion promoters—resulting in non-reversible connectivity between powdery electrode materials. The interconnectivity can be accomplished without completely coating the powdery electrode material—requiring less polymer and also creating less electrical resistance
e) PVDF-based compositions provide good connectivity, while the PTFE in PTFE-based compositions remain as discrete particles in the electrode.
f) Carbon black is easily dispersed in PVDF, but not in PTFE, and the increased dispersion increases the conductivity.

SUMMARY OF THE INVENTION

The invention relates to a composition comprising:

a) from 0.2 to 150 parts fluoropolymer particles having a weight average particle size of less than 500 nm;
b) optionally from 10 to 500 parts of one or more powdery electrode-forming materials;
c) optionally from 0 to 10 parts of one or more thickeners;
d) optionally, one or more pH adjusting agents;
e) from 0 to 10 parts of one or more additives selected from the group consisting of anti-settling agents and surfactants;
f) optionally from 0 to 5 parts of one or more wetting agents;
g) optionally from 0 to 150 parts of one or more fugitive adhesion promoters;
h) 100 parts water, all parts being parts by weight based on 100 parts by weight of water, and wherein the composition contains no fluorosurfactant.

Preferably the fluoropolymer is a polyvinylidene fluoride.

The invention further relates to a composition comprising:

a) from 0.2 to 150 parts polyvinylidene fluoride (PVDF) particles having a weight average particle size of less than 500 nm;
b) optionally from 10 to 400 parts of one or more powdery electrode-forming materials;
c) optionally from 0 to 10 parts of one or more thickeners;
d) optionally, one or more pH adjusting agents;
e) from 0 to 10 parts of one or more additives selected from the group consisting of anti-settling agents and surfactants;
f) optionally from 0 to 5 parts of one or more wetting agents;
g) an effective amount of one or more fugitive adhesion promoters;
h) 100 parts water;

all parts being parts by weight based on 100 parts by weight of water.

The invention further relates to an electrode comprising an electroconductive substrate coated with the aqueous electrode-forming compositions of the invention, and a method for producing the electrode from the composition(s) of the invention.

The invention further relates to a non-aqueous-type battery having at least one electrode of the invention.

DETAILED DESCRIPTION OF THE INVENTION

The invention relates to an aqueous, electrode-forming fluoropolymer-based compositions, and in particular to a polyvinylidene fluoride-based composition.

By "fluorosurfactant free" is meant that all surfactants used in making the aqueous fluoropolymer dispersion do not contain a fluorine atom (i.e. they are "non-fluorinated surfactants"). The term refers to all surfactants used in making and processing the aqueous fluoropolymer dispersion, and preferably to all the surfactants in the composition of the invention, including: all surfactants used during the polymerization process—whether added up-front, fed continuously during the polymerization, fed partly before and then during polymerization, or fed after the polymerization has started and progressed for a time; and preferably all surfactants added post-polymerization to improve latex stability.

By "irreversible" as used herein in relation to an electrode formed from the polymer binder of the aqueous composition, is meant that following the drying of the aqueous composition in which the polymer binder binds the powdery electrode-forming materials to each together and to the electroconductive substrate, the polymer binder is not soluble or redispersible in water. The irreversibility is due to the fact that the polymer particles flow and adhere to the powdery electrode-forming materials, providing interconnectivity within the electrode. This is opposed to an electrode formed from a PTFE dispersion or excessive thickener (such as carboxylated methyl cellulose) which form a binder without interconnectivity, and thus when the coating is placed in water it redispeses.

By "interconnectivity" is meant that the powdery electrode-forming materials are permanently bonded together by the polymeric binder, providing low electrical resistance and high ion mobility within the electrode.

The manner of practicing the invention will now be generally described with respect to a specific embodiment thereof, namely polyvinylidene fluoride based polymer prepared in aqueous emulsion polymerization using non-fluorinated emulsifier as the principle emulsifier and used in preparation of electrodes. Although the process of the invention has been generally illustrated with respect to PVDF based polymers, one of skill in the art will recognize that analogous polymerization techniques can be applied to the preparation of homopolymers and copolymers of fluorinated monomers and their formulation for the preparation of electrodes in general, and more specifically to homopolymers and copolymers of vinylidene fluoride (VDF), tetrafluoroethylene (TFE), and/or chlorotrifluoroethylene (CTFE)—with co-reactive monomers (fluorinated or non-fluorinated) such as hexafluoropropylene, perfluorovinyl ether, propane, vinyl acetate, and the like. While non-fluorinated surfactants are preferred, the use of fluorosurfactants is also anticipated by this invention.

PVDF

The term "vinylidene fluoride polymer" (PVDF) used herein includes both normally high molecular weight homopolymers, copolymers, and terpolymers within its meaning. Such copolymers include those containing at least 50 mole percent, preferably at least 75 mole %, more preferably at least 80 mole %, and even more preferably at least 85 mole % of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 mole percent tetrafluoroethylene, such as the copolymer composition disclosed in British Patent No. 827,308; and about 70 to 99 mole percent vinylidene fluoride and 1 to 30 mole percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as the copolymer composition described in U.S. Pat. No. 2,968,649 and terpolymers of vinylidene fluoride, trifluoroethylene and tetrafluoroethylene are also representatives of the class of vinylidene fluoride copolymers, which can be prepared by the process embodied herein.

In one embodiment, up to 20%, and preferably up to 15%, by weight of hexafluoropropene (HFP) units and 80%, preferably 85%, by weight or more of VDF units are present in the vinylidene fluoride polymer. It is desired that the HFP units be distributed as homogeneously as possible to provide PVDF-HFP copolymer with excellent dimensional stability in an end-use environment—such as in a battery.

The PVDF for use in the electrode composition preferably has a high molecular weight. By high molecular weight, as used herein, is meant PVDF having a melt viscosity of greater than 1.0 kilopoise according to ASTM method D-3835 measured at 450° F. and 100 $sec^{-1}$.

The PVDF used in the invention is generally prepared by polymerizing means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) is fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 110° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably, for regulatory reasons, the PVDF emulsion of the invention is made without fluorinated surfactants. Non-fluorinated surfactants useful in the PVDF polymerization could be both ionic and non-ionic in nature including, but are not limited to, 3-allyloxy-2-hydroxy-1-propane sulfonic acid salts, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent, and having a weight average particle size of less than 500 nm, preferably less than 400 nm, and more preferably less than 300 nm. The weight average particle size is generally at least 20 nm and preferably at least 50 nm. The composition of the invention contains 0.2 to 150 parts by weight of PVDF polymer binder particles per 100 parts of water, preferably 1 to 25 parts by weight. Additional adhesion promoters may also be added to improve the binding characteristics and provide connectivity that is non-reversible. A minor amount of one or more other water-miscible solvents, such as ethylene glycol, may be mixed into the PVDF latex to improve freeze-thaw stability.

In the present invention, PVDF polymer binder is generally used in the aqueous electrode-forming composition, however a blend of several different polymer binders, preferably all fluoropolymer binders, and most preferably all PVDF binders may also be used. In one embodiment, only thermoplastic fluoropolymers that can be softened by fugitive adhesion promoters are used as the polymeric binder.

Powdery Electrode-Forming Material

The composition of the invention contains 10 to 500 parts, preferably 20 to 400 parts, more preferably 25 to 300 parts of one or more powdery electrode-forming materials per 100 parts of water. The nature of the powdery electrode-forming material depends on whether the composition will be used to form a positive or a negative electrode. In the case of a positive electrode, the active electrode material may be an oxide, sulfide or hydroxide of lithium and/or a transition metal (including but not limited to cobalt, manganese, aluminum, titanium, or nickel, and iron phosphates, manganese phosphate). Double, and triple salts of lithium are also contemplated. Preferred positive electrode materials include, but are not limited to, $LiCoO_2$, $LiNi_xCo_{1-x}O_2$, $LiMn_2O_2$, $LiNiO_2$, LiFePO4, $LiNi_xCo_yMn_zO_m$, $LiNi_xM$-

$n_yAl_zO_m$ where x+y+z=1 and m is an integer representing the number of oxygen atom in the oxide to provide an electron-balanced molecule; as well as lithium-metal oxides such as lithium cobalt oxide, lithium iron phosphate, lithium manganese phosphate, lithium-nickel oxide, and lithium-manganese oxide.

In the case of a negative electrode, the active material is generally a carbonaceous material, nano-titanate, or other matrix capable of being doped with lithium ions. Useful carbonaceous materials include, but are not limited to graphite, manmade graphite, carbon, carbon black, acetylene black, phenolic resin, pitch, tar, etc. In the present invention carbon fibers can also be used.

The ratio of PVDF solids to powdery electrode-forming material is from 0.5-25, parts by weight of PVDF solids to 75 to 99.5 parts by weight powdery electrode material, preferably from 0.5-15, parts by weight of PVDF solids to 85 to 99.5 parts by weight powdery electrode material, more preferably from 1-10 parts by weight of PVDF solids to 90 to 99 parts by weight powdery electrode material, and in one embodiment from 2-8, parts by weight of PVDF solids to 92 to 98 parts by weight powdery electrode material. If less PVDF is used, complete interconnectivity may not be achieved, and if more PVDF is used, there is a reduction in conductivity, and also the composition takes up volume and adds weight—and one use of the composition is for very small and light batteries.

Surfactant/Anti-Settling Agent

The composition of the invention contains 0 to 10 parts, preferably from 0.1 to 10 parts, and more preferably 0.5 to 5 parts of one or more anti-settling agents and/or surfactants per 100 parts of water. In one embodiment the level of anti-settling agent or surfactant is from 2.7 to 10 parts per 100 parts of water. These anti-settling agents or surfactants are added to the PVDF dispersion post-polymerization, generally to improve the shelf stability, and provide additional stabilization during slurry preparation. Also during the polymerization process, the surfactant/anti-settling agent used in this invention could be added all upfront prior to polymerization, fed continuously during the polymerization, fed partly before and then during polymerization, or fed after polymerization started and progressed for a while.

Useful anti-settling agents include, but are not limited to, ionic substances, such as salts of alkyl sulfates, sulfonates, phosphates, phophonates (such as sodium lauryl sulfate and ammonium lauryl sulfate) and salts of partially fluorinated alkyl sulfates, carboxylates, phosphates, phosphonates (such as those sold under the CAPSTONE brandname by DuPont), and non-ionic surfactants such as the TRITON X series (from Dow) and PLURONIC series (from BASF). In one embodiment, only anionic surfactants are used. It is preferred that no fluorinated surfactants are present in the composition, either residual surfactant from the polymerization process, or added post-polymerization in forming or concentrating an aqueous dispersion.

Wetting Agent

The composition of the invention optionally contains 0 to 5 parts, preferably from 0 to 3 parts of one or more wetting agents per 100 parts of water. Surfactants can serve as wetting agents, but wetting agents may also include non-surfactants. In some embodiments, the wetting agent can be an organic solvent. It has been found that the presence of optional wetting agents permits uniform dispersion of powdery electrode material(s) into aqueous dispersion of vinylidene fluoride polymer. Some electrode materials, such as carbonaceous materials will not disperse in an aqueous dispersion without the use of wetting agent. Useful wetting agents include, but are not limited to, ionic and non-ionic surfactants such as the TRITON series (from Dow) and the PLURONIC series (from BASF), and organic liquids that are compatible with the aqueous dispersion, including but not limited to NMP, DMSO, and acetone.

Thickener/Rheology Modifier

The composition of the invention may contain 0 to 10 parts, preferably from 0 to 5 parts of one or more thickeners or rheology modifiers per 100 parts of water. Addition of water-soluble thickener or rheology modifier to the above dispersion prevents or slows down the settling of powdery electrode materials while providing appropriate slurry viscosity for a casting process. Useful thickeners include, but are not limited to the ACRYSOL series (from Dow Chemical); partially neutralized poly(acrylic acid) or poly(methacrylic acid) such as CARBOPOL from Lubrizol; and carboxylated alkyl cellulose, such as carboxylated methyl cellulose (CMC). Adjustment of the formulation pH can improve the effectiveness of some of the thickeners. In addition to organic rheology modifiers, inorganic rheology modifiers can also be used alone or in combination. Useful inorganic rheology modifiers include, but are not limited to, inorganic rheology modifiers including but not limited to natural clays such as montmorillonite and bentonite, manmade clays such as laponite, and others such as silica, and talc.

The thickeners of the invention are used in the aqueous composition containing the PVDF and powdery electrode material, and are not used in pure form as a second coating composition as has been described in the JP 2000357505 reference.

Fugitive Adhesion Promoter

A fugitive adhesion promoter is required to produce the interconnectivity needed in electrodes formed from the composition of the invention. By "fugitive adhesion promoter" as used herein is meant an agent that increases the interconnectivity of the composition after coating on a substrate. The fugitive adhesion promoter is then capable of being removed from the formed electrode generally by evaporation (for a chemical) or by dissipation (for added energy).

The fugitive adhesion promoter can be a chemical material, an energy source combined with pressure, or a combination, used at an effective amount to cause interconnectivity of the components of the aqueous composition during formation of the electrode. For chemical fugitive adhesion promoters, the composition contains 0 to 150 parts, preferably 1 to 100 parts, and more preferably from 2 to 30 parts, of one or more fugitive adhesion promoters per 100 parts of water. Preferably this is an organic liquid, that is soluble or miscible in water. This organic liquid acts as a plasticizer for PVDF particles, making them tacky and capable of acting as discrete adhesion points during the drying step. The PVDF polymer particles are able to soften, flow and adhere to powdery materials during manufacture, resulting in electrodes with high connectivity that are non-reversible. In one embodiment the organic liquid is a latent solvent, which is a solvent that does not dissolve or substantially swell PVDF resin at room temperature, but will solvate the PVDF resin at elevated temperatures. In one embodiment a useful organic solvent is N-methyl-2-pyrrolidone. Other useful fugitive adhesion promoter agents include, but are not limited to, dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea.

In the case of energy as the fugitive adhesion promoter, useful energy sources include, but are not limited to, heat, IR radiation, and radio frequency (RF). For heat alone, the temperature during the processing of the PVDF composition on an electrode should be about 20 to 50° C. above the melting point of the polymer. When energy alone is used as the fugitive adhesion promoter, it is preferred that the heat is combined with pressure—such as a calendering step, for good interconnectivity.

Other Additives.

The composition of the invention may further contain effective amounts of other additives, including but not limited to fillers, leveling agents, anti-foaming agents, pH buffers, and other adjuvants typically used in waterborne formulation while meeting desired electrode requirements.

The aqueous electrode-forming composition of the invention can be obtained in many different ways.

In one embodiment, a PVDF dispersion is formed (preferably without any fluorosurfactant) and a predetermined amount of any anti-settling agent(s) or surfactant(s), is diluted in water and post-added to the PVDF dispersion latex with stirring, in order to provide adequate storage stability for the latex. To this PVDF dispersion/anti-settling mixture is added, with stirring, optional wetting agent(s), followed by adding any thickener(s), fugitive adhesion promoter(s), and then bringing the pH up to the appropriate range for the thickener to be effective, if necessary. Some thickeners such as CMC are effective in a wide range of pH, i.e. from 3 to 9 pH for CMC. The electrode-forming powdery material(s) and other ingredients are then added to the mixture. It may be advantageous to disperse the electrode-forming powdery material(s) in the fugitive adhesion promoter, the latent solvent or wetting agent to provide wetting of the powdery materials prior to admixing with the aqueous PVDF binder formulation. The final composition is then subjected to a high shear mixing to ensure uniform distribution of the powdery material in the composition. The final aqueous composition of the invention should have a viscosity useful for casting or coating onto a substrate. The useful viscosity is in the range of from 2,000 to 20,000 cps at 20 rpm, and 25° C. depending on application methods.

The aqueous electrode composition is applied onto at least one surface, and preferably both face surfaces, of an electroconductive substrate by means known in the art, such as by brush, roller, ink jet, squeegee, foam applicator, curtain coating, vacuum coating, or spraying. The electroconductive substrate is generally thin, and usually consists of a foil, mesh or net of a metal, such as aluminum, copper, lithium, iron, stainless steel, nickel, titanium, or silver. The coated electroconductive substrate is then dried to form a coherent composite electrode layer, which may then be calendered, providing an interconnected composite electrode usable in a non-aqueous-type battery. The aqueous electrode composition can be optionally baked at elevated temperature to achieve high adhesion strength. The dried electrode can be optionally subjected to calendering at high pressure and high temperature to further improve electrode adhesion.

The aqueous electrode composition of the present invention has an advantage in processing, in that water has a boiling point lower than the commonly used solvents for PVDF, and thus can be dried faster, or at a lower temperature than solvent-based PVDF compositions, and lower than compositions containing PTFE. Process temperatures of 150° C. or less, 120° C. or less, 100° C. or less and even 90° C. or less may be used and result in a useful electrode.

Another advantage of using the aqueous coating of the present invention over the solvent coatings of the art, is that an aqueous PVDF dispersion serves as a binder with polymer particles binding together the powdery electrode materials only at specific discrete points to produce interconnectivity, while a solution coating forms a continuous coating on the powdery electrode materials. The continuous polymer coating formed from solution coatings, while very thin, still serves as an insulator, reducing the electrical conductivity.

The electrodes of the invention can be used to form an electrochemical device, such as a battery, capacitor, electric double layer capacitor, membrane electrode assembly (MEA) or fuel cell, by means known in the art. A non-aqueous-type battery can be formed by placing a negative electrode and positive electrode on either side of a separator. The separator is generally a polymeric porous film impregnated with an electrolytic solution.

EXAMPLES

General:

The latex of the invention is prepared by a typical process for making fluoropolymers using emulsifiers. The emulsifiers may be ionic or non-ionic, such as those containing blocks of polyethylene glycol, polypropylene glycol and/or polytetramethylene glycol. Preferably, the process and fluoropolymer produced contain no fluorinated or partially fluorinated surfactant. The fluoropolymer dispersions produced have good latex stability and shelf-life, and are coagulum-free. These preferred dispersions are absolutely free of fluorinated or partially fluorinated surfactant—with no fluorinated surfactant being used in either the synthesis or in a post-addition.

In the polymerization process, the emulsifier of this invention could be added all upfront prior to polymerization, fed continuously during the polymerization, fed partly before and then during polymerization, or fed after polymerization started and progressed for a while.

Examples 1-3

Into an 80-gallon stainless steel reactor was charged, 345 lbs of deionized water, 72 grams of PLURONIC 31 R1 (non-fluorinated non-ionic surfactant from BASF), and the desired amount of propane as a chain transfer agent. Following evacuation, agitation was begun at 23 rpm and the reactor was heated. After reactor temperature reached the desired set point of 83° C., the VDF charge was started. Reactor pressure was then raised to 650 psi by charging approximately 40 lbs VDF into the reactor. After reactor pressure was stabilized, 4.5 lbs of initiator solution made of 0.5 wt % potassium persulfate and 0.5 wt % sodium acetate was added to the reactor to initiate polymerization. The rate of further addition of the initiator solution was adjusted to obtain and maintain a final VDF polymerization rate of roughly 70 pounds per hour. The VDF homopolymerization was continued until approximately 170 pounds VDF was introduced in the reaction mass. The VDF feed was stopped and the batch was allowed to react-out at the reaction temperature to consume residual monomer at decreasing pressure. After 20 minutes, the agitation was stopped and the reactor was vented and the latex recovered. Solids in the recovered latex were determined by gravimetric technique and were about 30 weight % and weight average particle size was measured by NICOMP laser light scattering instrument and was found to be about 220 nm.

TABLE 1

| Examples | CTA (g) Propane | Melt Viscosity (kp) @ 230° C. & 4 $s^{-1}$ | Solution viscosity (Pa-s) 5% in NMP @ 20° C. |
|---|---|---|---|
| 1 | 0 | 1200 | >100 |
| 2 | 12 | 900 | 50 |
| 3 | 170 | 200 | 7.5 |

The PVDF latex of example 2 is then formulated into an aqueous electrode-forming composition and applied to an electro-conductive substrate and dried.

Example 4

A cathode-forming aqueous slurry was prepared by weighing 120 grams of $LiCoO_2$ and 8.3 grams of carbon black (VULCAN XC72R from Cabot) in a 500 ml stainless-steel vessel and dry mixing at 500-1000 rpm for 5 minutes in a disperser. To the dry mixture 3.4 grams of N-methyl-2-pyrrolidone (NMP), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 150 grams of the rheology modifier solution was added to the $LiCoO_2$/carbon black mixture and dispersed at 2000-2500 rpm for 10 minutes in a disperser. The final slurry was a smooth, thick paste.

To the smooth, thick aqueous paste of $LiCoO_2$/carbon black, 36 grams of 20 wt % solids PVDF emulsion such as in Example 1 was added along with 0.57 grams of a polyether siloxane copolymer emulsion defoamer (TEGO Foamex 1488) and mixed at 300-400 rpm for 2 minutes resulting in a smooth cathode-forming aqueous slurry. After 24 and 48 hours the cathode-forming slurry was stable without any syneresis.

TABLE 2

| | Amounts (gm) | % on Total | Solids | % Solids |
|---|---|---|---|---|
| $LiCoO_2$ | 120.00 | 0.376 | 120.00 | 87.32% |
| Carbon Black | 8.30 | 0.026 | 8.30 | 6.04% |
| NMP | 3.40 | 0.011 | 0.00 | 0.00% |
| TRITON CF10 Surfactant | 0.64 | 0.002 | 0.64 | 0.47% |
| TEGO Foamex 810 | 0.25 | 0.001 | 0.25 | 0.18% |
| CARBOPOL 940 (0.6% aq) | 150.00 | 0.470 | 0.90 | 0.65% |
| PVDF Emulsion (20 wt %) | 36.00 | 0.113 | 7.20 | 5.24% |
| TEGO Foamex 1488 | 0.57 | 0.002 | 0.14 | 0.10% |
| Total | 319.16 | 1.000 | 137.43 | 100.00% |

Example 5

A cathode-forming aqueous slurry was prepared by weighing 120 grams of $LiCoO_2$ and 8.3 grams of carbon black (VULCAN XC72R from Cabot) in a 500 ml stainless-steel vessel and dry mixing at 500-1000 rpm for 5 minutes in a disperser. To the dry mixture 3.4 grams of N-methyl-2-pyrrolidone (NMP), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 150 grams of the rheology modifier solution was added to the $LiCoO_2$/carbon black mixture and dispersed at 2000-2500 rpm for 10 minutes in a disperser. The final slurry was a smooth, thick paste.

To the smooth, thick aqueous paste of $LiCoO_2$/carbon black, 36 grams of 20 wt % solids PVDF emulsion such as in Example 1 was added along with 3.57 grams of NMP and 0.57 grams of a polyether siloxane copolymer emulsion defoamer (TEGO Foamex 1488) and mixed at 300-400 rpm for 2 minutes resulting in a smooth cathode-forming aqueous slurry. After 24 and 48 hours the cathode-forming slurry was stable without any syneresis.

TABLE 3

| | Amounts (gm) | % on Total | Solids | % Solids |
|---|---|---|---|---|
| $LiCoO_2$ | 120.00 | 0.372 | 120.00 | 87.32% |
| Carbon Black | 8.30 | 0.026 | 8.30 | 6.04% |
| NMP | 3.40 | 0.011 | 0.00 | 0.00% |
| TRITON CF10 Surfactant | 0.64 | 0.002 | 0.64 | 0.47% |
| TEGO Foamex 810 | 0.25 | 0.001 | 0.25 | 0.18% |
| CARBOPOL 940 (0.6% aq) | 150.00 | 0.465 | 0.90 | 0.65% |
| PVDF Emulsion (20 wt %) | 36.00 | 0.112 | 7.20 | 5.24% |
| NMP | 3.57 | 0.011 | 0.00 | 0.00% |
| TEGO Foamex 1488 | 0.57 | 0.002 | 0.14 | 0.10% |
| Total | 322.73 | 1.000 | 137.43 | 100.00% |

Example 6

The cathode-forming slurry described in Example 3 was applied over a 14 micron thick aluminum current collector with a Doctor blade and baked in a convection oven at 120° C. for 30 minutes. The final electrode film had a film thickness of 55 microns and had good adhesion and crack resistance under bending. Scanning Electron Micrographs of electrode surface and cross-section showed interconnectivity with fused PVDF binder.

Example 7

A cathode-forming aqueous slurry was prepared by weighing 120 grams of $LiCo_{1/3}Mn_{1/3}Ni_{1/3}O_2$ and 8.3 grams of carbon black (VULCAN XC72R from Cabot) in a 500 ml stainless-steel vessel and dry mixed at 500-1000 rpm for 5 minutes in a disperser. To the dry mixture 3.4 grams of N-methyl-2-pyrrolidone (NMP), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 150 grams of the rheology modifier solution was added to the $LiCo_{1/3}Mn_{1/3}Ni_{1/3}O_2$/carbon black mixture and dispersed at 2000-2500 rpm for 10 minutes in a disperser. The final slurry was a smooth, thick paste.

To the smooth, thick aqueous paste of $LiCo_{1/3}Mn_{1/3}Ni_{1/3}O_2$/carbon black, 36 grams of 20 wt % solids PVDF emulsion as in Example 1 was added along with 0.57 grams of a polyether siloxane copolymer emulsion defoamer (TEGO Foamex 1488) and mixed at 300-400 rpm for 2 minutes resulting in a smooth cathode-forming aqueous slurry. After 24 and 48 hours the cathode-forming slurry was stable without any syneresis.

TABLE 4

| | Amounts (gm) | % on Total | Solids | % Solids |
|---|---|---|---|---|
| $LiCo_{1/3}Mn_{1/3}Ni_{1/3}O_2$ | 120.00 | 0.376 | 120.00 | 87.32% |
| Carbon Black | 8.30 | 0.026 | 8.30 | 6.04% |
| NMP | 3.40 | 0.011 | 0.00 | 0.00% |
| TRITON CF10 Surfactant | 0.64 | 0.002 | 0.64 | 0.47% |
| TEGO Foamex 810 | 0.25 | 0.001 | 0.25 | 0.18% |
| CARBOPOL 940 (0.6% aq) | 150.00 | 0.470 | 0.90 | 0 65% |
| PVDF Emulsion (20 wt %) | 36.00 | 0.113 | 7.20 | 5.24% |
| TEGO Foamex 1488 | 0.57 | 0.002 | 0.14 | 0.10% |
| Total | 319.16 | 1.00 | 137.43 | 100.00% |

Example 8

A cathode-forming aqueous slurry was prepared by weighing 120 grams of $LiCo_{1/3}Mn_{1/3}Ni_{1/3}O_2$ and 8.3 grams of carbon black (VULCAN XC72R from Cabot) in a 500 ml stainless-steel vessel and dry mixing at 500-1000 rpm for 5 minutes in a disperser. To the dry mixture 3.4 grams of N-methyl-2-pyrrolidone (NMP), 0.64 grams of nonionic surfactant (TRITON CF-10) and 0.25 grams of oil-based defoamer (TEGO Foamex 810) was added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 150 grams of the rheology modifier solution was added to the $LiCo_{1/3}Mn_{1/3}Ni_{1/3}O_2$/carbon black mixture and dispersed at 2000-2500 rpm for 10 minutes in a disperser. The final slurry was a smooth, thick paste.

To the smooth, thick aqueous paste of $LiCo_{1/3}Mn_{1/3}Ni_{1/3}O_2$/carbon black, 36 grams of 20 wt % solids PVDF emulsion such as in Example 1 was added along with 3.57 grams of NMP and 0.57 grams of a polyether siloxane copolymer emulsion defoamer (TEGO Foamex 1488) and mixed at 300-400 rpm for 2 minutes resulting in a smooth cathode-forming aqueous slurry. After 24 and 48 hours the cathode-forming slurry was stable without any syneresis.

TABLE 5

| | Amounts (gm) | % on Total | Solids | % Solids |
|---|---|---|---|---|
| $LiCo_{1/3}Mn_{1/3}Ni_{1/3}O_2$ | 120.00 | 0.372 | 120.00 | 87.32% |
| Carbon Black | 8.30 | 0.026 | 8.30 | 6.04% |
| NMP | 3.40 | 0.011 | 0.00 | 0.00% |
| TRITON CF10 Surfactant | 0.64 | 0.002 | 0.64 | 0.47% |
| TEGO Foamex 810 | 0.25 | 0.001 | 0.25 | 0.18% |
| CARBOPOL 940 (0.6% aq) | 150.00 | 0.465 | 0.90 | 0.65% |
| PVDF Emulsion (20 wt %) | 36.00 | 0.112 | 7.20 | 5.24% |
| NMP | 3.57 | 0.011 | 0.00 | 0.00% |
| TEGO Foamex 1488 | 0.57 | 0.002 | 0.14 | 0.10% |
| Total | 322.73 | 1.00 | 137.43 | 100.00% |

Example 9

The $LiCo_{1/3}Mn_{1/3}Ni_{1/3}O_2$ cathode-forming slurry described in Example 5 was applied over a 14 micron thick aluminum current collector with a doctor blade and baked in a convection oven at 90° C. for 30 minutes. The final electrode film had a film thickness of 55 microns and had good adhesion and crack resistance under bending. Scanning Electron Micrographs of electrode surface and cross-section showed partially fused PVDF binder.

Example 10

The $LiCo_{1/3}Mn_{1/3}Ni_{1/3}O_2$ cathode-forming slurry described in Example 6 was applied over a 14 micron thick aluminum current collector with a doctor blade and baked in a convection oven at 120° C. for 30 minutes. The final electrode film had a film thickness of 55 microns and had good adhesion and crack resistance under bending. Scanning Electron Micrographs of electrode surface and cross-section showed interconnectivity with fused PVDF binder.

Example 11

A cathode-forming aqueous slurry was prepared by weighing 120 grams of $LiFePO_4$ P1 (Phostech Lithium Inc.) with average particle size ($D_{50}$) of 2-4 microns and 8.3 grams of carbon black (VULCAN XC72R from Cabot) in a 500 ml stainless-steel vessel and dry mixing at 500-1000 rpm for 5 minutes in a disperser. To the dry mixture 3.4 grams of N-methyl-2-pyrrolidone (NMP), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 180 grams of the rheology modifier solution was added to the $LiFePO_4$ P1/carbon black mixture and dispersed at 2000-2500 rpm for 10 minutes in a disperser. The final slurry was a smooth, thick paste.

To the smooth, thick aqueous paste of $LiFePO_4$ P1/carbon black, 36 grams of 20 wt % solids PVDF emulsion as in Example 1 was added along with 8 grams of DI water and 0.57 grams of a polyether siloxane copolymer emulsion defoamer (TEGO Foamex 1488) and mixed at 300-400 rpm for 2 minutes resulting in a smooth cathode-forming aqueous slurry. After 24 and 48 hours the cathode-forming slurry was stable without any syneresis.

TABLE 6

| | Amounts (gm) | % on Total | Solids | % Solids |
|---|---|---|---|---|
| $LiFePO_4$ P1 (D50: 2-4 microns) | 120.00 | 0.336 | 120.00 | 87.20% |
| Carbon Black | 8.30 | 0.023 | 8.30 | 6.03% |
| NMP | 3.40 | 0.010 | 0.00 | 0.00% |
| TRITON CF10 Surfactant | 0.64 | 0.002 | 0.64 | 0.47% |
| TEGO Foamex 810 | 0.25 | 0.001 | 0.25 | 0.18% |
| CARBOPOL 940 (0.6% aq) | 180.00 | 0.504 | 1.08 | 0.78% |
| PVDF Emulsion (20 wt %) | 36.00 | 0.101 | 7.20 | 5.23% |
| TEGO Foamex 1488 | 0.57 | 0.002 | 0.14 | 0.10% |
| DI Water | 8.00 | 0.022 | 0.00 | 0.00% |
| Total | 357.16 | 1.00 | 137.61 | 100.00% |

Example 12

A cathode-forming aqueous slurry was prepared by weighing 120 grams of $LiFePO_4$ P2 (Phostech Lithium Inc.) with average particle size ($D_{50}$) of 0.5-1 microns and 8.3 grams of carbon black (VULCAN XC72R from Cabot) in a 500 ml stainless-steel vessel and dry mixing at 500-1000 rpm for 5 minutes in a disperser. To the dry mixture 3.4 grams of N-methyl-2-pyrrolidone (NMP), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 2.4 grams of the rheology modifier to 397.6 grams of DI water under vigorous stirring. Approximately, 220 grams of the rheology modifier solution was added to the $LiFePO_4$ P2/carbon black mixture and dispersed at 2000-2500 rpm for 10 minutes in a disperser. The final slurry was a smooth, thick paste.

To the smooth, thick aqueous paste of $LiFePO_4$ P2/carbon black, 36 grams of 20 wt % solids PVDF emulsion as in Example 1 was added along with 8 grams of DI water and 0.57 grams of a polyether siloxane copolymer emulsion defoamer (TEGO Foamex 1488) and mixed at 300-400 rpm for 2 minutes resulting in a smooth cathode-forming aqueous slurry. After 24 and 48 hours the cathode-forming slurry was stable without any syneresis.

TABLE 7

| | Amounts (gm) | % on Total | Solids | % Solids |
|---|---|---|---|---|
| $LiFePO_4$ P2 (D50: 0.5-1 microns) | 120.00 | 0.30 | 120.00 | 87.05% |
| Carbon Black | 8.30 | 0.02 | 8.36 | 6.02% |
| NMP | 3.40 | 0.01 | 0.00 | 0.00% |
| TRITON CF10 Surfactant | 0.64 | 0.002 | 0.64 | 0.46% |
| TEGO Foamex 810 | 0.25 | 0.001 | 0.25 | 0.18% |
| CARBOPOL 940 (0.6% aq) | 220.31 | 0.56 | 1.32 | 0.96% |
| PVDF Emulsion (20 wt %) | 36.00 | 0.09 | 7.20 | 5.22% |
| TEGO Foamex 1488 | 0.57 | 0.001 | 0.14 | 0.10% |
| DI Water | 6.00 | 0.02 | 0.00 | 0.00% |
| Total | 395.47 | 1.00 | 137.85 | 100.00% |

Example 13

A cathode-forming aqueous slurry was prepared by weighing 120 grams of $LiMnO_2$ with average particle size ($D_{50}$) of 0.5-1 microns and 8.3 grams of carbon black (VULCAN XC72R from Cabot) in a 500 ml stainless-steel vessel and dry mixing at 500-1000 rpm for 5 minutes in a disperser. To the dry mixture 3.4 grams of N-methyl-2-pyrrolidone (NMP), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 140 grams of the rheology modifier solution was added to the $LiMnO_2$/Carbon black mixture and dispersed at 2000-2500 rpm for 10 minutes in a disperser. The final slurry was a smooth, thick paste. To the smooth, thick aqueous paste of $LiMnO_2$/Carbon black, 36 grams of 20 wt % solids PVDF emulsion as in Example 1 was added along with 8 grams of DI water and 0.57 grams of a polyether siloxane copolymer emulsion defoamer (TEGO Foamex 1488) and mixed at 300-400 rpm for 2 minutes resulting in a smooth cathode-forming aqueous slurry. After 24 and 48 hours the cathode-forming slurry was stable without any syneresis.

TABLE 8

| | Amounts (gm) | % on Total | Solids | % Solids |
|---|---|---|---|---|
| $LiMnO_2$ | 120.00 | 0.388 | 120.00 | 87.36% |
| Carbon Black | 8.30 | 0.027 | 8.30 | 6.04% |
| NMP | 3.40 | 0.011 | 0.00 | 0.00% |
| TRITON CF10 Surfactant | 0.64 | 0.002 | 0.64 | 0.47% |
| TEGO Foamex 810 | 0.25 | 0.001 | 0.25 | 0.18% |
| CARBOPOL 940 (0.6% aq) | 140.00 | 0.453 | 0.84 | 0.61% |
| PVDF Emulsion (20 wt %) | 36.00 | 0.116 | 7.20 | 5.24% |
| TEGO Foamex 1488 | 0.57 | 0.002 | 0.14 | 0.10% |
| Total | 309.16 | 1.00 | 137.37 | 100.00 |

Example 14

A cathode-forming aqueous slurry was prepared by weighing 120 grams of $LiCoO_2$ and 8.3 grams of Carbon Black (VULCAN XC72R from Cabot) in a 500 ml stainless-steel vessel and dry mixing at 500-1000 rpm for 5 minutes in a disperser. To the dry mixture 3.4 grams of dimethyl sulfoxide (DMSO), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 150 grams of the rheology modifier solution was added to the $LiCoO_2$/carbon black mixture and dispersed at 2000-2500 rpm for 10 minutes in a disperser. The final slurry was a smooth, thick paste.

To the smooth, thick aqueous paste of $LiCoO_2$/carbon black, 36 grams of 20 wt % solids PVDF emulsion as in Example 1 was added along with 0.57 grams of a polyether siloxane copolymer emulsion defoamer (TEGO Foamex 1488) and mixed at 300-400 rpm for 2 minutes resulting in a smooth cathode-forming aqueous slurry. After 24 hours the cathode-forming slurry was stable without any syneresis.

TABLE 9

| | Amounts(gm) | % on Total | Solids | % Solids |
|---|---|---|---|---|
| $LiCoO_2$ | 120.00 | 0.376 | 120.00 | 87.32% |
| Carbon Black | 8.30 | 0.026 | 8.30 | 6.04% |
| DMSO | 3.40 | 0.011 | 0.00 | 0.00% |
| TRITON CF10 Surfactant | 0.64 | 0.002 | 0.64 | 0.47% |
| TEGO Foamex 810 | 0.25 | 0.001 | 0.25 | 0.18% |
| CARBOPOL 940 (0.6% aq) | 150.00 | 0.470 | 0.90 | 0.65% |
| PVDF Emulsion (20 wt %) | 36.00 | 0.113 | 7.20 | 5.24% |
| TEGO Foamex 1488 | 0.57 | 0.002 | 0.14 | 0.10% |
| Total | 319.16 | 1.000 | 137.43 | 100.00% |

Example 15

A cathode-forming aqueous slurry was prepared by weighing 120 grams of $LiCoO_2$ and 8.3 grams of carbon black (VULCAN XC72R from Cabot) in a 500 ml stainless-steel vessel and dry mixing at 500-1000 rpm for 5 minutes in a disperser. To the dry mixture 3.4 grams of dimethyl sulfoxide (DMSO), 64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 150 grams of the rheology modifier solution was added to the $LiCoO_2$/carbon black mixture and dispersed at 2000-2500 rpm for 10 minutes in a disperser. The final slurry was a smooth, thick paste.

To the smooth, thick aqueous paste of $LiCoO_2$/carbon black, 15 grams of 20 wt % solids PVDF emulsion as in Example 1 was added along with 0.57 grams of a polyether siloxane copolymer emulsion defoamer (TEGO Foamex 1488) and mixed at 300-400 rpm for 2 minutes resulting in a smooth cathode-forming aqueous slurry. After 24 hours the cathode-forming slurry was stable without any syneresis.

TABLE 10

| | Amounts (gm) | % on Total | Solids | % Solids |
|---|---|---|---|---|
| $LiCoO_2$ | 120.00 | 0.402 | 120.00 | 90.07% |
| Carbon Black | 8.30 | 0.028 | 8.30 | 6.23% |
| DMSO | 3.40 | 0.011 | 0.00 | 0.00% |
| TRITON CF10 Surfactant | 0.64 | 0.002 | 0.64 | 0.48% |
| TEGO Foamex 810 | 0.25 | 0.001 | 0.25 | 0.19% |
| CARBOPOL 940 (0.6% aq) | 150.00 | 0.503 | 0.90 | 0.68% |
| PVDF Emulsion (20 wt %) | 15.00 | 0.050 | 3.00 | 2.25% |
| TEGO Foamex 1488 | 0.57 | 0.002 | 0.14 | 0.10% |
| Total | 298.16 | 1.000 | 133.23 | 100.00% |

Example 16

A cathode-forming aqueous slurry was prepared by weighing 120 grams of $LiCoO_2$ and 8.3 grams of carbon black (VULCAN XC72R from Cabot) in a 500 ml stainless-steel vessel and dry mixing at 500-1000 rpm for 5 minutes in a disperser. To the dry mixture 3.4 grams of dimethyl sulfoxide (DMSO), 0.64 grams of nonionic surfactant (TRITON CF-10) and 0.25 grams of oil-based defoamer (TEGO Foamex 810) were added and mixed again at 500-1000 rpm for 5 minutes in a disperser. A 0.6 wt % solution of a polyacrylate copolymer (CARBOPOL 940) rheology modifier was prepared in DI water by adding 1.2 grams of the rheology modifier to 198.8 grams of DI water under vigorous stirring. Approximately, 150 grams of the rheology modifier solution was added to the $LiCoO_2$/carbon black mixture and dispersed at 2000-2500 rpm for 10 minutes in a disperser. The final slurry was a smooth, thick paste.

To the smooth, thick aqueous paste of $LiCoO_2$/carbon black, 60 grams of 20 wt % solids PVDF emulsion as in Example 1 was added along with 0.57 grams of a polyether siloxane copolymer emulsion defoamer (TEGO Foamex 1488) and mixed at 300-400 rpm for 2 minutes resulting in a smooth cathode-forming aqueous slurry.

TABLE 11

| | Amount (gm) | % on Total | Solids | % Solids |
|---|---|---|---|---|
| $LiCoO_2$ | 120.00 | 0.350 | 120.00 | 84.37% |
| Carbon Black | 8.30 | 0.024 | 8.30 | 5.84% |
| DMSO | 3.40 | 0.010 | 0.00 | 0.00% |
| TRITON CF10 Surfactant | 0.64 | 0.002 | 0.64 | 0.45% |
| TEGO Foamex 810 | 0.25 | 0.001 | 0.25 | 0.18% |
| CARBOPOL 940 (0.6% aq) | 150.00 | 0.437 | 0.90 | 0.63% |
| PVDF Emulsion (20 wt %) | 60.00 | 0.175 | 12.00 | 8.44% |
| TEGO Foamex 1488 | 0.57 | 0.002 | 0.14 | 0.10% |
| Total | 343.16 | 1.000 | 142.23 | 100.00% |

Example 17

The $LiCoO_2$ cathode-forming slurry described in Example 14 was applied over a 14 micron thick aluminum current collector with a doctor blade and baked in a convection oven at 120° C. for 30 minutes. The final electrode film had a film thickness of 70 microns and had good adhesion and crack resistance under bending.

Examples 18

Positive electrodes were produced using the PVDF aqueous dispersions described in Example 1-3. Two sets of two 18650 cells (cylindrical batteries) with design capacity of 2 Ah were produced using $LiCoO_2$ or $LiNiCoMnO_2$ active powdery materials.

The positive electrode was comprised of 94% powdery active materials ($LiCoO_2$ or $LiNiCoMnO_2$) plus conductive material), 5% of the aqueous dispersion PVDF binder (on a dry solids basis), plus less than 1% thickener and other additives including antifoaming agent in order to have an appropriate, workable slurry viscosity. Less than 5% (on total weight of slurry) of a fugitive adhesion promoter, NMP, was added to the slurry to provide interconnectivity within the electrode.

The negative electrode was comprised of manmade graphite plus conductive powdery materials (97.5%), and water borne styrene-butadiene rubber (SBR) binder (2.5% on dry basis). Both positive and negative electrodes were dried and then calendered to ensure good interconnectivity.

After initial charge and discharge cycles, all four batteries were tested at room temperature and were cycled at 0.45, 1.2, 2.4, 3.6 and 4.8 A current rates. Both sets of batteries achieved over 95% of theoretical capacities and showed good capacity retention, which is indicative of good interconnectivity.

Both sets of batteries were cycled at 0.8 C discharge/1 C charge for at least 20 times at room temperature where no significant reduction in the capacity was observed.

Examples 19

A set of batteries was produced using a flat pouch design, having 3 Ah design capacity. The positive electrode was comprised of active ingredient $LiNiCoMnO_2$ (88.2%), conductive carbon (acetylene black and super P, total of 6%), thickener (CMC, 0.8%), and water borne PVDF binder (5% on dry basis). The negative electrode was comprised of manmade graphite (86.5%), conductive carbon (acetylene black and super P, total of 5.5%), thickener (CMC, 7.0%), and water borne PVDF binder (1% on dry basis). Electrodes were subjected to heat and pressure to ensure interconnectivity.

After initial charge and discharge cycles, batteries were tested at room temperature and were cycled at 0.2, 0.5, 1, 3, and 5 C rates. The battery performance was at 100, 98.5, 94.8, 86.8, and 82.2% of design capacity respectively. The batteries maintained 95% of their design capacity when subjected to over 250 cycles at 1 C rate, illustrating good interconnectivity.

What is claimed is:

1. A device comprising:

a) at least one electrode comprising an electroconductive substrate coated on at least one surface with dried, interconnected powdery electrode-forming materials bonded with discrete PVDF particles formed from an aqueous composition comprising:

1) from 0.2 to 150 parts fluoropolymers binder particles free of fluorosurfactant having a weight average particle size of less than 500 nm, wherein said fluoropolymer is a polyvinylidene fluoride (PVDF) homopolymer or copolymer comprising at least 70 mole percent of vinylidene fluoride units;

2) from 10 to 500 parts of one or more powdery electrode-forming materials, wherein said powdery electrode material is selected from the group consisting of salts of lithium and at least one transition metal, a carbonaceous material or nano-titanate;

3) optionally from 0 to 10 parts of one or more thickeners;

4) optionally, one or more pH adjusting agents;

5) optionally from 0 to 10 parts of one or more additives selected from the group consisting of anti-settling agents and surfactants;

6) optionally from 0 to 5 parts of one or more wetting agents;

7) from 1-50 parts of one or more fugitive adhesion promoters;

8) 100 parts water;

all parts being parts by weight based on 100 parts by weight of water, wherein the composition contains no fluorosurfactant, and wherein said electrode exhibits interconnectivity; and b) a separator comprising a polymeric porous film having at least one surface coated with dried, interconnected powdery electrode-forming materials bonded with discrete PVDF particles formed from an aqueous composition comprising:

1) from 0.2 to 150 parts fluoropolymers binder particles free of fluorosurfactant having a weight average particle size of less than 500 nm, wherein said fluoropolymer is a polyvinylidene fluoride (PVDF) homopolymer or copolymer comprising at least 70 mole percent of vinylidene fluoride units;

2) an effective amount of filler;

3) optionally from 0 to 10 parts of one or more thickeners;

4) optionally, one or more pH adjusting agents;

5) optionally from 0 to 10 parts of one or more additives selected from the group consisting of anti-settling agents and surfactants;

6) optionally from 0 to 5 parts of one or more wetting agents;

7) from 1-50 parts of one or more fugitive adhesion promoters;

8) 100 parts water;

all parts being parts by weight based on 100 parts by weight of water, wherein the composition contains no fluorosurfactant, and wherein said separator exhibits interconnectivity.

2. The device of claim 1, wherein said electrode is an electroconductive substrate coated on at least one surface with dried, interconnected powdery electrode-forming materials bonded with discrete PVDF particles formed from an aqueous composition comprising:

a) from 1 to 100 parts of fluoropolymer particles having a weight average particle size of less than 400 nm;

b) from 20 to 400 parts of one or more powdery electrode-forming materials;

from 2 to 100 parts of one or more organic carbonates;

d) 100 parts of water;

all parts are by weight and based on 100 parts by weight ofwater;

and wherein said separator comprises a polymeric porous film having at least one surface with dried, interconnected powdery electrode-forming materials bonded with discrete PVDF particles formed from an aqueous composition comprising:

a) from 1 to 100 parts of fluoropolymer particles having a weight average particle size of less than 400 nm;

b) an effective amount of filler;

c) from 2 to 100 parts of one or more organic carbonates;

d) 100 parts of water;

all parts are by weight and based on 100 parts by weight of water.

3. The device of claim 1, wherein said PVDF in both the at least one electrode and said separator has a melt viscosity of greater than 1.0 kp, by ASTM D-3835 at 450° F. and $100^{-1}$ sec.

4. The device of claim 1, wherein the fluoropolymer discrete particles on both the at least one electrode and said separator have a weight average particle size less than 400 nanometers.

5. The device of claim 1, wherein said powdery electrode material comprises one or more materials selected from the group consisting of lithium-salts of transition metal oxides, sulfides and hydroxides; $LiCoO_2$, $LiNi_xCo_{1-x}O_2$, $LiMn_2O_2$, $LiNiO_2$, LiFePO4, $LiNi_xCo_yMn_zO_m$, $LiNi_xMn_yAl_zO_m$ where x+y+z=1 and m is an integer representing the number of oxygen atom in the oxide to provide an electron-balanced molecule; lithium cobalt oxide, lithium iron phosphate, lithium manganese phosphate, lithium-nickel oxide, and lithium-manganese oxide, carbonaceous materials, nano-titanates, graphite, activated carbon, carbon black, phenolic resin, pitch, tar, and carbon fibers.

6. The device of claim 1, wherein said PVDF in both the at least one electrode and said separator has a melt viscosity of greater than 1.0 kp, by ASTM D-3835 at 450° F. and $100^{-1}$ sec.

7. The device of claim 1, wherein said PVDF in both the at least one electrode and said separator is a homopolymer or a copolymer comprising at least 70 weight percent of vinylidene fluoride monomer units.

8. The device of claim, wherein the PVDF discrete particles on both the at least one electrode and said separator have a weight average particle size less than 300 nanometers.

9. The device of claim 1 wherein said device is a non-aqueous-type battery, a capacitor, or a membrane electrode assembly.

* * * * *